US006622797B2

(12) United States Patent
Sivley, IV

(10) Patent No.: US 6,622,797 B2
(45) Date of Patent: Sep. 23, 2003

(54) APPARATUS AND METHOD TO EXPAND CASING

(75) Inventor: Robert S. Sivley, IV, Kingwood, TX (US)

(73) Assignee: Hydril Company, Houston, TX (US)

( * ) Notice: Subject to any disclaimer, the term of this patent is extended or adjusted under 35 U.S.C. 154(b) by 42 days.

(21) Appl. No.: 10/004,179

(22) Filed: Oct. 24, 2001

(65) Prior Publication Data

US 2003/0075338 A1 Apr. 24, 2003

(51) Int. Cl.[7] .............................................. E21B 43/10
(52) U.S. Cl. .......................... 166/380; 166/207; 166/217
(58) Field of Search ................................ 166/206, 207, 166/209, 216, 217, 380

(56) References Cited

U.S. PATENT DOCUMENTS

| 5,348,095 A | 9/1994 | Worrall et al. ............. 166/380 |
| 5,667,011 A | 9/1997 | Gill et al. ................... 166/295 |
| 6,012,523 A | 1/2000 | Campbell et al. ........... 166/277 |
| 6,021,850 A | 2/2000 | Wood et al. ................ 166/380 |
| 6,029,748 A | 2/2000 | Forsyth et al. ............. 166/380 |
| 6,085,838 A | 7/2000 | Vercaemer et al. ......... 166/277 |
| 6,457,532 B1 * | 10/2002 | Simpson ..................... 166/380 |

* cited by examiner

*Primary Examiner*—David Bagnell
*Assistant Examiner*—Jennifer Dougherty
(74) *Attorney, Agent, or Firm*—Rosenthal & Osha L.L.P.

(57) ABSTRACT

A tool for radially plastically expanding a pipe having a threaded connection therein, that includes a first section. The first section has an increasing diameter and increasing cone angle along a direction of travel through the pipe. The first section includes a first outer surface adapted to contact an inner surface of the pipe at a plurality of selected contact patches on the first outer surface. The tool also includes a second section axially disposed behind the first section along the direction of travel. The second section has an increasing diameter and decreasing cone angle along the direction of travel. The second section includes a second outer surface adapted to contact an inner surface of the pipe at at least one selected contact patch on the second outer surface.

25 Claims, 11 Drawing Sheets

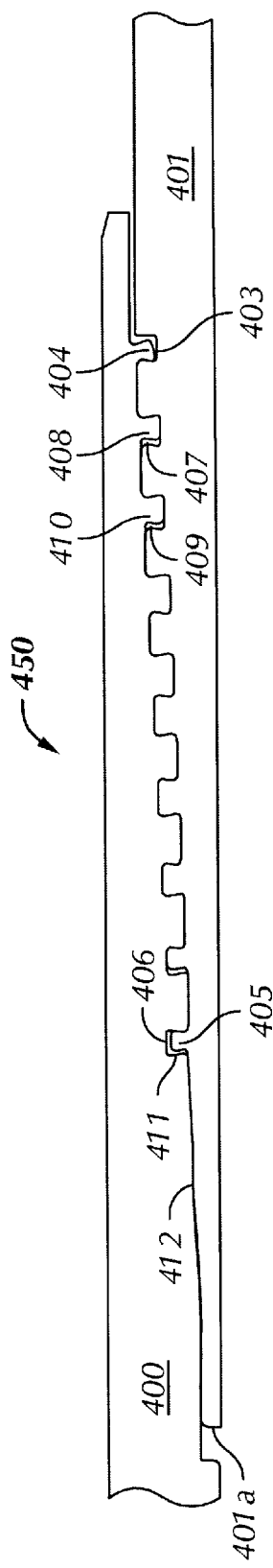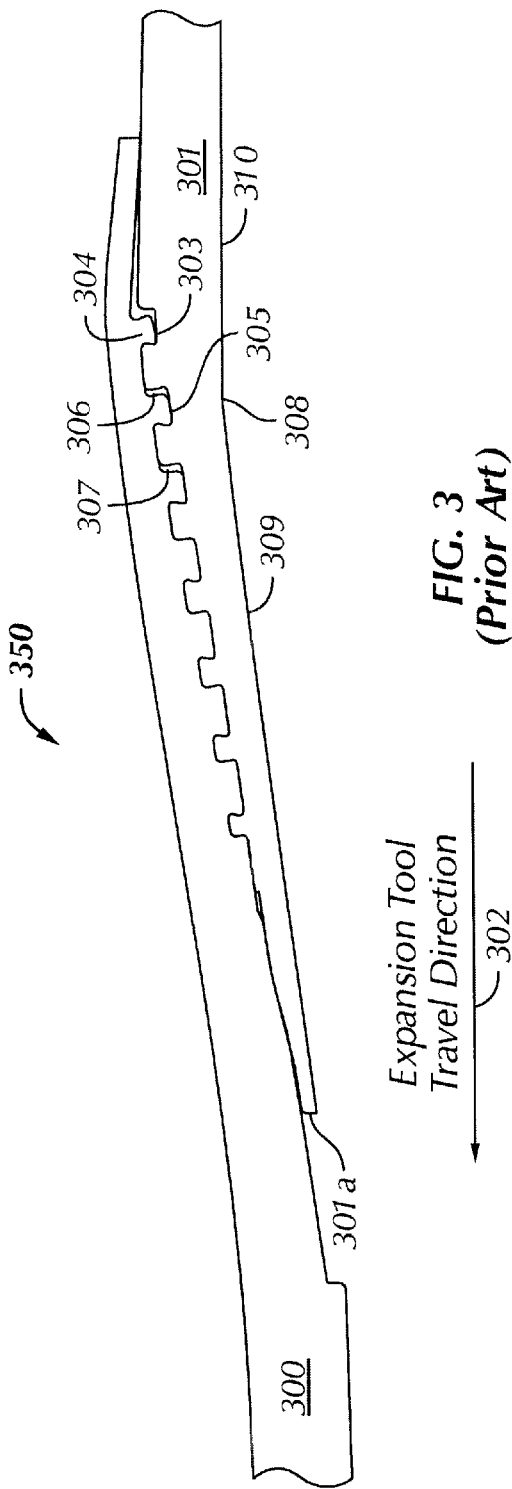
FIG. 4
(Prior Art)
FIG. 3
(Prior Art)

APPARATUS AND METHOD TO EXPAND CASING

BACKGROUND OF INVENTION

1. Field of the Invention

This invention relates generally to a device and method adapted for use with oilfield pipe ("tubulars"). More specifically, the invention relates to a device and method used to plastically radially expand downhole tubular members in a wellbore.

2. Background Art

Casing joints, liners, and other oilfield tubulars are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomer seal (e.g., an o-ring seal), a metal-to-metal seal formed proximate the connection, or similar seals known in the art.

In some well construction operations, it is advantageous to radially plastically expand threaded pipe or casing joints in a drilled ("open") hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

In conventional oilfield drilling, casing strings are installed at regular intervals whereby the casing for the next interval is installed through the casing for the previous interval. This means that the outer diameter of a casing string is limited by the inner diameter of the previously installed casing string. Thus the casing strings in a conventional wellbore are nested relative to each other, with casing diameters decreasing in a downward direction.

Conventionally, an annular space is provided between each string of casing and the wellbore so that cement may be pumped into the annular space or annulus to seal between the casing and the wellbore.

Because of the nested arrangement of the casing strings in a conventional wellbore, and the annular space required around the casing strings for cement, the hole diameter required at the top of the wellbore is relatively large. This large initial wellbore diameter may lead to increased costs due to the expense of large diameter casing, the expense of drilling large diameter holes, and the added expense of cementing a large casing string.

In addition, the nested arrangement of the casing strings in a conventional wellbore can severely limit the inner diameter of the final casing string at the bottom of the wellbore, which restricts the potential production rate of the well.

It is desirable that a casing string can be radially expanded in situ after it has been run into the wellbore through the previous casing string, so as to minimize the reduction of inner diameter of the final casing string at the bottom of the wellbore. Radially expanding a casing string in the wellbore has the added benefit of reducing the annular space between the drilled wellbore and the casing string, which reduces the amount of cement required to effect a seal between the casing and the wellbore.

When a cold-forming expansion process is used (e.g., when a cold-forming expansion tool or "pig' is moved through a casing string so as to radially plastically expand the casing string), the casing string is usually run into the hole "box-down" (e.g., the "box" or female threaded connection is run into the hole facing downhole so that the expansion tool ("pig") does not deform the "pin" nose or male threaded connection when the expansion tool is forced upward through the casing string). Note that tubular strings such as drill pipe, casing, or similar tubular members are normally run into the hole "pin-down" because it is easier to make up the threaded connections in the tubular string.

Various expandable casing techniques have already been developed. An expansion tool is typically used to plastically radially expand a string of casing or tubing disposed inside a wellbore from an initial condition (e.g., from an initial diameter) to an expanded condition (e.g., with a larger diameter). One common prior-art expansion process uses a conically tapered, cold-forming expansion tool (commonly referred to as a "pig") to expand casing in a wellbore. The expansion tool is generally attached to a lower end of a casing string that is run into the wellbore. A leading mandrel of the expansion tool generally comprises a cylinder with an external diameter that is less than a "drift" diameter of the made-up casing or tubing that is to be radially expanded. The expansion tool includes a tapered section having a taper angle that is generally between 5 degrees and 45 degrees. The expansion tool is generally symmetric about a longitudinal axis thereof. The expansion tool also includes a cylindrical section having a diameter typically corresponding to a desired expanded inner diameter of a casing string. The cylindrical section is followed by a tapered section.

After the casing string is set in place in the hole, usually by hanging-off the casing string from a casing hanger, a working string of drillpipe or tubing is run into the wellbore and attached to the expansion tool (e.g., the working string is generally attached to the leading mandrel). The expansion tool may also comprise an axial bore therethrough (not shown) so that pressurized fluid (e.g., drilling fluid) may be pumped through the working string, through the expansion tool, and in to the wellbore so as to hydraulically pressurize the wellbore. Hydraulic pressure acts on a piston surface defined by a lower end of the expansion tool, and the hydraulic pressure is combined with an axial upward lifting force on the working string to force the expansion tool upward through the casing string so as to outwardly radial displace the casing string to a desired expanded diameter. In this expansion process, a rate of radial expansion is determined by, for example, a total plastic strain required to expand the casing string, the taper angle, and a rate of axial displacement of the expansion tool through the casing string. Consistency of the expansion process is controlled by transitions along the expansion tool and a cross-sectional area of, for example, lengths of casing that form the casing string, threaded connections that couple the length of casing, and the like.

The expansion tool may be inserted into the casing string at either the bottom or the top, depending on the tool design and the application. Radial expansion may be performed at rates of, for example, 25 to 60 feet per minute. Other expansion processes, such as expansion under localized hydrostatic pressure, or "hydroforming," are known in the art, but are generally not used as much as the aforementioned cold-forming expansion process.

U.S. Pat. No. 5,348,095, issued to Worrall et al, discloses a method of creating a wellbore in an underground formation. A borehole is drilled in the underground formation, whereafter a casing of a ductile material is lowered into the borehole. The casing is selected to have a smaller elastic radial deformation than the surrounding formation when the casing is radially expanded against the borehole wall by application of a radial force to the casing. The radial force is applied to the casing so as to radially expand the casing against the borehole wall thereby inducing a plastic radial deformation of the casing and an elastic radial deformation of the surrounding underground formation, whereafter the radial force is removed from the casing.

U.S. Pat. No. 5,667,011, issued to Gill et al, discloses a method of creating a casing in a borehole formed in an underground formation. The method comprises the steps of (a) installing a tubular liner in the borehole, the liner being radially expandable in the borehole whereby the liner in its radially expanded position has a plurality of openings which are overlapping in the longitudinal direction of the liner, (b) radially expanding the liner in the borehole, and (c) either before or after step (b), installing a body of hardenable fluidic sealing material in the borehole so that the sealing material fills the openings and thereby substantially closes the openings. The sealing material is selected so as to harden in the openings and thereby to increase the compressive strength of the liner.

U.S. Pat. No. 6,012,523, issued to Campbell et al, discloses a downhole apparatus for use in expanding liner or tubing. The apparatus comprises a body for connection to a string and an expansion portion on the body. The expansion portion includes a plurality of radially movable parts for defining an outer surface thereof. The parts are initially arranged in an axially and circumferentially offset first configuration in which the parts may assume a smaller diameter first configuration. The apparatus is then run into a borehole and through a length of expandable tubing. The parts are then moved radially outwardly and axially aligned such that the parts assume a larger diameter second configuration and define a substantially continuous outer circumference. The expansion portion is then pulled through the tubing to expand the tubing.

U.S. Pat. No. 6,021,850, issued to Wood et al, discloses a method and apparatus of expanding tubulars. In the preferred embodiment, a rounded tubular is inserted through a larger tubular while suspended on a mandrel. A stop device, such as a liner hanger, is attached to the larger tubular after delivery downhole on the mandrel. Upon engagement of the liner hanger or other stop device to the larger tubular, the mandrel is freely movable with respect to the stop device. The mandrel contains a deforming device such as a conically shaped wedge located below the tubular to be expanded. A force is applied from the surface to the mandrel, pulling the wedge into the tubular to be expanded. When the wedge clears through the tubular to be expanded, it releases the stop device so that the stop device can be retrieved with the mandrel to the surface. Thus, the stop device is supported by the larger tubing while the smaller tubing is expanded when the wedge is pulled through it. Should the tubular being expanded contract longitudinally while it is being expanded radially, it is free to move away from the stop device.

U.S. Pat. No. 6,029,748, issued to Forsyth et al, discloses an apparatus and method that allow for downhole expansion of long strings of rounded tubulars, using a technique that expands the tubular from the top to the bottom. The apparatus supports the tubular to be expanded by a set of protruding dogs which can be retracted if an emergency release is required. A conically shaped wedge is driven into the top of the tubing to be expanded. After some initial expansion, a seal behind the wedge contacts the expanded portion of the tubing. Further driving of the wedge into the tubing ultimately brings in a series of back-up seals which enter the expanded tubing and are disengaged from the driving mandrel at that point. Further applied pressure now makes use of a piston of enlarged cross-sectional area to continue the further expansion of the tubular. When the wedge has fully stroked through the tubular, it has by then expanded the tubular to an inside diameter larger than the protruding dogs which formerly supported it. At that point, the assembly can be removed from the wellbore. An emergency release, involving dropping a ball and shifting a sleeve, allows, through the use of applied pressure, the shifting of a sleeve which supports the dog which in turn supports the tubing to be expanded. Once the support sleeve for the dog has shifted, the dog can retract to allow removal of the tool, even if the tube to be expanded has not been fully expanded.

U.S. Pat. No. 6,085,838, issued to Vercaemer et al, discloses a method of cementing a well permitting a reduction in the degree of diameter reduction of casing or liners required, and not requiring excessively large initial conductor casing. The method is characterized by provision of an enlarged wellbore and a novel liner structure which is adapted for expansion of a reduced diameter section thereof downhole, providing, before expansion of the section, unimpeded flow of fluid from the enlarged wellbore during cementing and close fit of the expanded section with the casing or preceding liner, after cementing is completed and expansion of the section. A novel well liner structure and novel well liner expansion means are also disclosed.

SUMMARY OF INVENTION

In one aspect, the invention comprises a tool for radially plastically expanding a pipe having a threaded connection therein, that includes a first section. The first section has an increasing diameter and increasing cone angle along a direction of travel through the pipe. The first section includes a first outer surface adapted to contact an inner surface of the pipe at a plurality of selected contact patches on the first outer surface. The tool also includes a second section axially disposed behind the first section along the direction of travel. The second section has an increasing diameter and decreasing cone angle along the direction of travel. The second section includes a second outer surface adapted to contact an inner surface of the pipe at at least one selected contact patch on the second outer surface.

In another aspect, the invention comprises a method of expanding casing comprising forcing a casing expansion tool through a casing segment. The casing segment has a smaller inside diameter than a largest outside diameter of the expansion tool. The expansion tool includes an outer surface, and a plurality of contact patches on the outer surface. The contact patches are adapted to contact a section of casing at a plurality of axial locations on the inside diameter of the casing.

In another aspect, the invention comprises a downhole apparatus including a casing expansion tool comprising an outer surface and a plurality of contact patches on the outer surface. Two adjacent contact patches define two circumferential contact surfaces having two different diameters. The apparatus also includes a section of casing. An inside surface of the section of casing is in contact with a plurality of the circumferential contact surfaces of the casing expansion tool on at least two axial locations.

Other aspects and advantages of the invention will be apparent from the following description and the appended claims.

BRIEF DESCRIPTION OF DRAWINGS

FIG. 3 shows a made-up tubular threaded connection with wedge threads during the expansion by a prior art frustoconical expansion tool.

FIG. 4 shows the made-up tubular threaded connection of FIG. 3 in the expanded state, that is, after the prior art expansion tool has passed completely through the connection.

DETAILED DESCRIPTION

The radial plastic expansion of made-up threaded connections on oilfield and other tubular goods may exhibit structural sealing problems in the expanded threaded connections. Threaded connections that undergo radial expansion have a tendency to exhibit a non-uniform axial elongation and react differently to residual hoop stresses remaining after radial expansion. Specifically, male (pin) threaded members and female (box) threaded members deform differently during radial expansion. Depending on a direction of travel of the expansion tool (e.g., pin to box or box to pin), the second member to undergo radial expansion will generally move away from the first member. This differential displacement phenomenon results in a loss of preload in axially-engaged seals, making the use of conventional metal-to-metal seals (including, for example, shoulder seals) generally ineffective for plastically radially expanded casing and tubing.

When a joint of casing or tubing is radially plastically expanded, a wall thickness of the casing joint and an overall axial length of the casing joint are reduced by a process commonly referred to as "Poissoning," and residual stresses are retained in the casing joint. At any given finite element proximate a middle of the casing joint, the casing joint will maintain a substantially uniform diameter and wall thickness because each finite element experiences support from adjoining finite elements.

Figure 1:
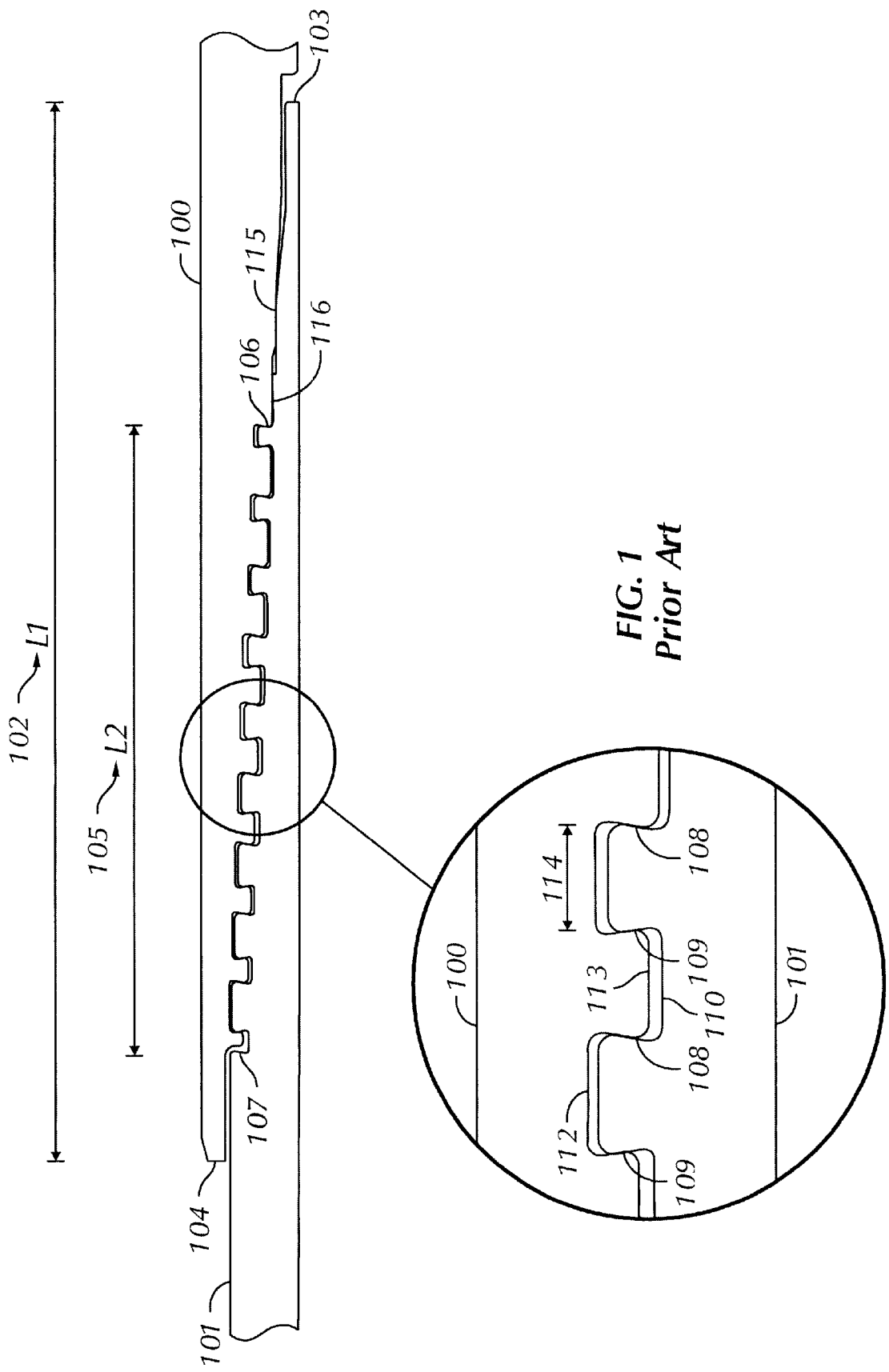
FIG. 1 shows a partial cross section of a made-up prior art tubular threaded connection with wedge threads and a metal-to-metal internal seal.

FIG. 1 shows a cross section of made-up tubular threaded connection with wedge threads and a metal-to-metal internal seal of a type which is preferred for use on expandable casing. Wedge threads are generally dovetail shaped threads with converging thread crest width. Wedge threads are extensively disclosed in U.S. Pat. No. RE 30,647, U.S. Pat. No. RE34,467, U.S. Pat. No. 4,703,954, and U.S. Pat. No. 5,454,605, all assigned to the assignee of the current invention. This made-up connection consists of female box connection 100, and male pin connection 101. The made-up connection has overall connection length 102 (or the quantity L1)from pin nose 103 to box nose 104, and engaged thread length 105 (or the quantity L2) from the beginning of first engaged thread on the pin 106 to the end of last engaged thread on the pin 107. Note that engaged thread length 105 cannot always be measured in the same axial plane as implied by FIG. 1, as the start of the first engaged thread will not always lie in the same axial plane as the end of the last engaged thread.

The wedge thread-form has stab flanks 108, so called because they generally come into contact when the threaded connection is initially "stabbed" together to be made-up. The thread-form also has load flanks 109, so called because they carry tensile load exerted on a made-up connection within a string of casing hanging in a wellbore. The thread-form on pin connection 101 has pin thread roots 110 and pin thread crests 111 with pin thread crest width 114. The thread-form on box connection 100 has box thread roots 112 and box thread crests 113.

Wedge threads are a suitable thread-form for expandable casing applications because (a) their generally dovetail-shaped thread-form resists radial forces during and after expansion which might tend to separate the pin connection from the box connection, and (b) because they may not make-up against a radial torque shoulder, but instead typically make-up by simultaneous contact of thread load flanks 109 and stab flanks 108. During the expansion process, axial strains in the connection will often cause a radial torque shoulder to fail when the compressive stresses at the shoulder exceed the compressive yield strength of the casing material. Other types of tubular threaded connections can also be successfully used in expanded casing applications with a tool and method according to the invention.

The made-up connection of FIG. 1 has an internal metal-to-metal seal area 115. This type of metal-to-metal seal is of a type taught by U.S. Pat. No. 5,423,579, issued to Blose et al. To achieve a metal-to-metal seal of this type, the two seal surfaces on the pin and box must come together to form a thin cylindrical or frustoconical contact patch (commonly achieved in the current art through the use of mismatched seal angles on the pin and box elements) and there must be a certain minimum contact stress at the seal contact patch to effect sealing against internal pressure inside the casing. Conventionally, this contact stress may be developed during make-up when the pin and box seal surfaces are axially forced together as the connection is threaded together ("made-up") and the pin seal area is deflected slightly inwards. This slight deflection creates a residual bending stress in the pin nose which in turn creates the contact stress at the seal contact patch.

Figure 2:
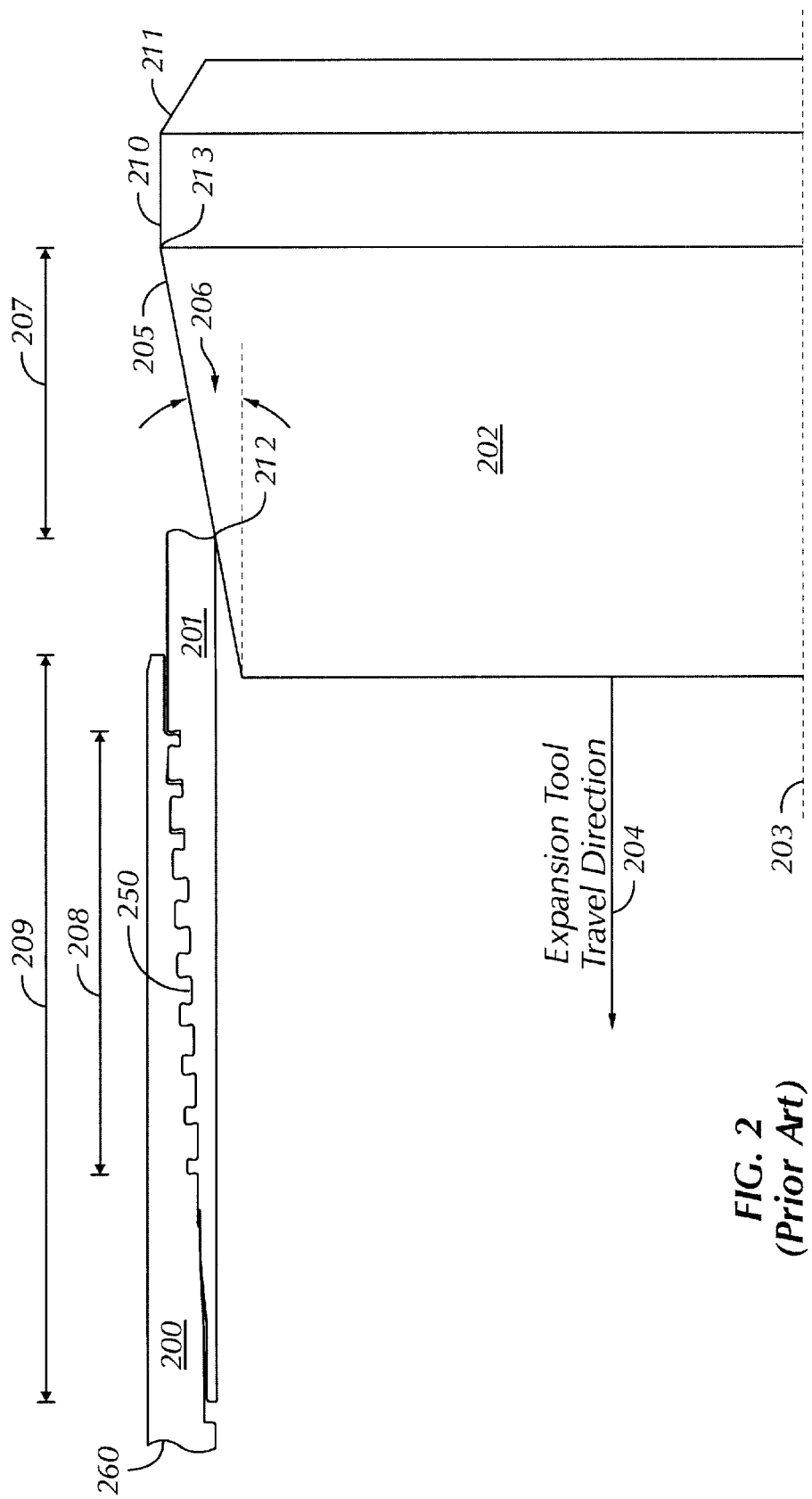
FIG. 2 shows a sectional view of a typical prior art conical expansion tool, beginning to deform casing pipe with a made-up tubular threaded connection.

FIG. 2 is a sectional drawing of a typical prior art conical expansion tool 202 (or "expansion pig"), beginning to deform casing pipe 260 with a made-up tubular threaded connection 250 consisting of box connection 200 and pin connection 201. The made-up tubular threaded connection 250 has overall connection length 209 and engaged thread length 208.

The conical expansion tool 202 and the made-up tubular threaded connection 250 share a common center line 203. In this figure, conical expansion tool 202 is forced through the casing 260 in expansion tool direction of travel 204.

Conical expansion tool 202 has cylindrical surface 210, frustoconical exit surface 211, and frustoconical expansion surface 205 with cone angle 206 (labeled α) of approximately 10 degrees from axial, and an active length 207. The intersection of cylindrical surface 210 and frustoconical expansion surface 205 forms inflection point 213.

Most prior art expansion tools have a cone angle larger than 10 degrees. A shallow cone angle 206 is used in the example of the prior art shown in FIG. 2 to demonstrate that simply using a shallow cone angle 206 on a frustoconical expansion surface 205 may still present deficiencies of other prior art expansion tools having large cone angles when used to expand tubular threaded connections.

The active length 207 of the frustoconical expansion surface 205 is defined as the axial length of the expansion surface 205 from the intersection with the inside surface of the casing 212 to the inflection point 213 (the intersection of expansion surface 205 and cylindrical surface 210). The active length 207 is therefore the section of the frustoconical expansion surface 205 that bears on the inside surface of the casing 212 during the casing expansion process. It is characteristic of prior art expansion tools that the active length of the expansion surface is quite short, typically in order to minimize the friction between the expansion tool and the casing. Typically, the active length 207 of the expansion surface is shorter than engaged thread length 208 of the connection to be expanded.

In one embodiment of the invention, it has been discovered through experimentation and Finite Element Analysis that tubular threaded connections on expandable oilfield casing and the like which are mechanically expanded as with a frustoconical expansion tool must be axially supported during the expansion process, either by continuous support over the engaged thread length, or preferably at a number of points within the engaged thread length. Some possible consequences of using an expansion tool which is too short to properly support the threaded connection are illustrated in FIGS. 3 and 4.

FIG. 3 shows a made-up tubular threaded connection 350 with wedge threads consisting of box connection 300 and pin connection 301, similar to the connection shown in FIG. 2, during the expansion by a prior art frustoconical expansion tool (not shown) with the threaded section of the connection over the active length of the expansion tool. As is common practice in the prior art, the expansion tool proceeds in expansion tool travel direction 302, from pin connection 301 to box connection 300, to avoid gross deformation of the pin nose 301A. This requirement severely restricts the expansion operation, in that either the expansion tool (not shown) must travel down the well (if the string is run into the hole in the conventional manner, with the pin connection facing down) or the string must be run into the hole "box down" (which is generally much slower, and therefore more expensive) to allow the expansion tool (not shown) to travel up the well.

The box end 300A of the made-up connection 350 has already passed inflection point 308, which is the intersection of the frustoconical expansion surface 309 and cylindrical surface 310. Note that the last engaged female thread 303 on the pin connection has "combed open" (so-called because the effect resembles the spreading of the teeth of a comb as it is bent backwards at its spine) and that the first engaged male thread 304 on the box connection has experienced severe plastic deformation in bending. Similar "combing" is beginning to occur at next female thread 305 on the pin connection, which is directly adjacent to inflection point 308 on the expansion tool, and a large clearance gap has formed at stab flank 306 of the second engaged male thread on the box. Note that a clearance gap at stab flank 307 has already begun to form, even though there is not yet evidence at this point in the connection of "combing."

FIG. 4 shows made-up tubular threaded connection 450 of FIG. 3 in the expanded state, that is, after the expansion tool (not shown) has passed completely through the connection in expansion tool travel direction 402. The made-up tubular threaded connection 450 consists of box connection 400 and pin connection 401.

The last engaged female thread 403 of the pin connection 401 has experienced significant axial strain as a result of the "combing" induced by the expansion tool. The first engaged male thread 404 of the box connection 400 exhibits the plastic deformation in bending seen in FIG. 3. As a result, these threads have essentially no stab flank contact and greatly reduced load flank contact. The next engaged male thread 408 of the box connection 400 shows similar plastic deformation in bending, which contributes to a large clearance gap at the load flank 407. The next engaged male thread 410 of the box connection 400 shows slightly less plastic deformation in bending, but still has a significant clearance gap at the corresponding load flank 409.

Similarly, last engaged female thread 406 of the box connection 400 exhibits plastically enlarged thread width, while first engaged male thread 405 of the pin connection 401 exhibits plastic deformation in bending, resulting in a very large load flank clearance gap 411.

In addition, pin nose 401A will typically be slightly radially deformed inward, reducing the contact stress at metal-to-metal seal 412. Expansion with a prior art expansion tool, particularly an expansion tool with a simple frustoconical expansion surface, usually causes the metal-to-metal seal to begin to leak during the expansion process. This can be a critical limitation for those expansion processes which rely on fluid pressure behind the expansion tool to help propel the tool. Using prior art expansion processes to expand a tubular threaded connection with a metal-to-metal seal, it is unlikely that the metal-to-metal seal will survive the expansion process intact.

A possible result of these deformations in a tubular threaded connection caused by prior art expansion methods is that (a) the efficiency of the connection (commonly defined as the ratio of a mechanical property of the pipe body, such as axial tension capacity, to the same mechanical property across the connection) may drop severely after casing expansion, despite the fact that the pipe body wall thickness is generally reduced during the expansion process, thus reducing the mechanical properties of the pipe body itself, and (b) metal-to-metal seals may not survive the expansion process.

Figure 5:
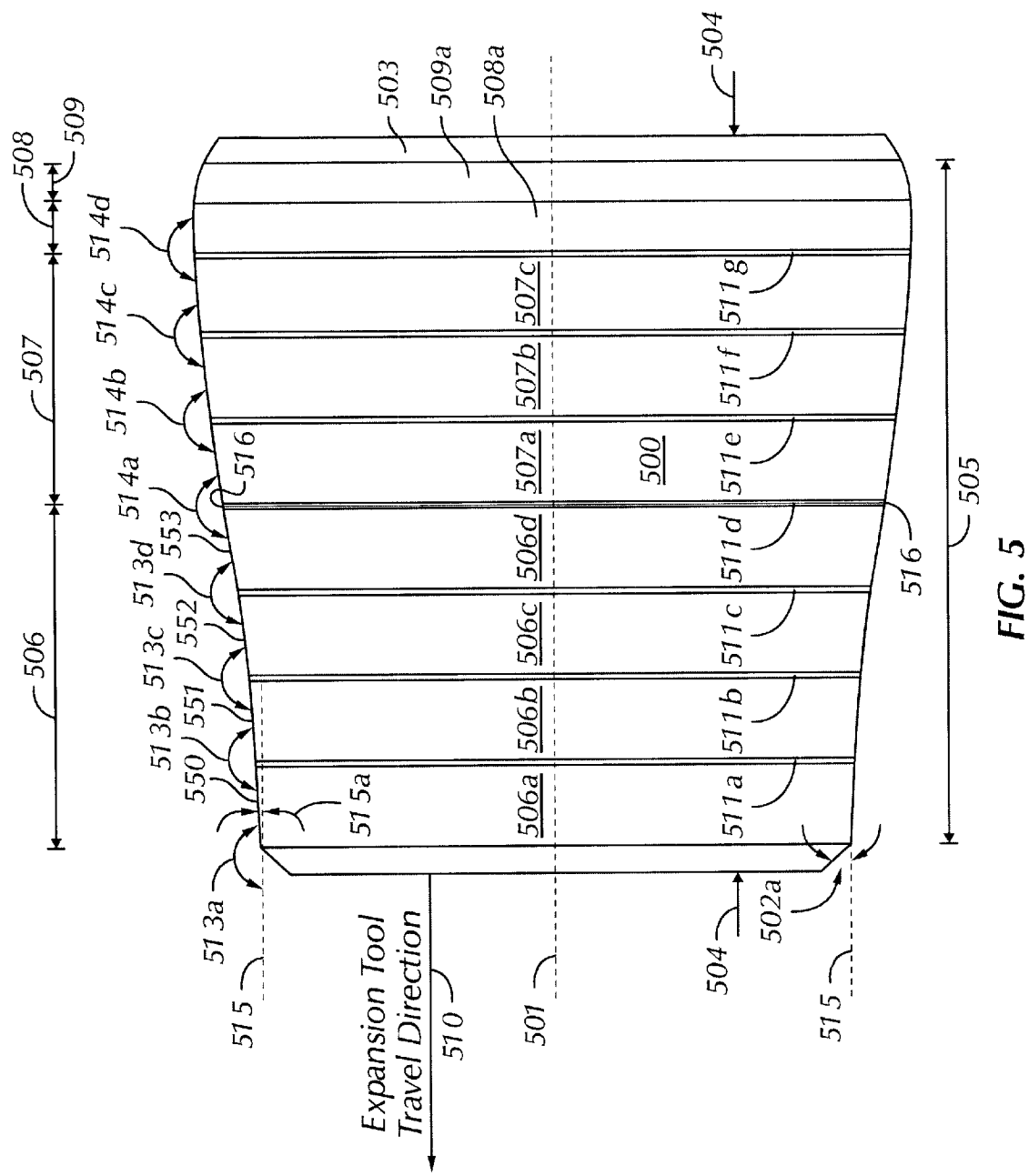
FIG. 5 shows a cross-sectional view of an embodiment of the casing expansion tool of the current invention.

FIG. 5 shows a cross-section of an embodiment of a casing expansion tool 500 of the current invention. Expansion tool 500 is axi-symmetric about centerline 501, has first chamfer 502 with chamfer angle 502A, and last chamfer 503, overall length 504, length-less-chamfers 505, and expansion tool direction of travel 510. Length-less-chamfers 505 is divided into four sections: first expansion section 506, second expansion section 507, cylindrical section 508, and tail section 509.

First expansion section 506 in this embodiment is further divided into four substantially equal-length frustoconical expansion segments 506A through 506D, each with a different cone angle, and separated by radius intervals 511A through Expansion segment 506A has included angle 513A of approximately 177.5 degrees from cylindrical plane 515, equivalent to a cone angle β 515A of 2.5 degrees. The cone angle β 515A is the angle formed by the intersection of cylindrical plane 515 and the outer surface 550 of expansion segment 506A. The included angles 513B through 513D between adjacent expansion segments 506A through 506D are also approximately 177.5 degrees in this embodiment of the current invention. That is, the cone angle for expansion segment 506B is approximately 5.0 degrees (the angle formed by the intersection of cylindrical plane 515 and the outer surface 551 of expansion segment 506B), the cone angle for expansion segment 506C is approximately 7.5 degrees (the angle formed by the intersection of cylindrical plane 515 and the outer surface 552 of expansion segment 506C), and the cone angle for expansion segment 506D is approximately 10.0 degrees (the angle formed by the intersection of cylindrical plane 515 and the outer surface 553 of expansion segment 506D). In the first expansion section 506 of this embodiment, each segment has a cone angle that is 2.5 degrees greater than the previous segment.

Second expansion section 507 is further divided into three substantially equal-length frustoconical expansion segments 507A through 507C, each with a different cone angle, and separated by radius intervals 511E and 511F. In the second expansion section 507 of this embodiment, each segment has a cone angle that is 2.5 degrees less than the previous segment.

First expansion section 506 and second expansion section 507 are separated by inflection plane 516 which lies at the midpoint of radius interval 511D. The included angle 514A between expansion segments 506D (the last expansion segment in first expansion section 506) and expansion segment 507A (the first expansion segment of second expansion section 507) is approximately 182.5 degrees in this embodiment. The cone angle of expansion segment 507A is therefore approximately 7.5 degrees.

The included angles 514B and 514C between adjacent expansion segments 507A through 507C, and included angle 514D between expansion segment 507C and cylindrical segment 508A, are also all approximately 182.5 degrees in this embodiment of the current invention. That is, the cone angle for expansion segment 507B is approximately 5.0 degrees, and the cone angle for expansion segment 507C is approximately 2.5 degrees.

Generally, expansion segments 506A through 506D within first expansion section 506 form a "concave" surface, that is, each frustoconical expansion segment in first expansion section 506 has a larger cone angle than the preceding segment. Generally, expansion segments 507A through 507C within second expansion section 507 form a "convex" surface, that is, each frustoconical expansion segment in second expansion section 507 has a smaller cone angle than the preceding segment.

In one embodiment, it has been determined from modeling and experimentation that the cone angle β 515A of first expansion segment 506A of the first expansion section 506 should be between about 2 degrees and about 6 degrees, and that the included angle between adjacent expansion segments should be between about (180°−β) and (180°+β).

Figure 5A:
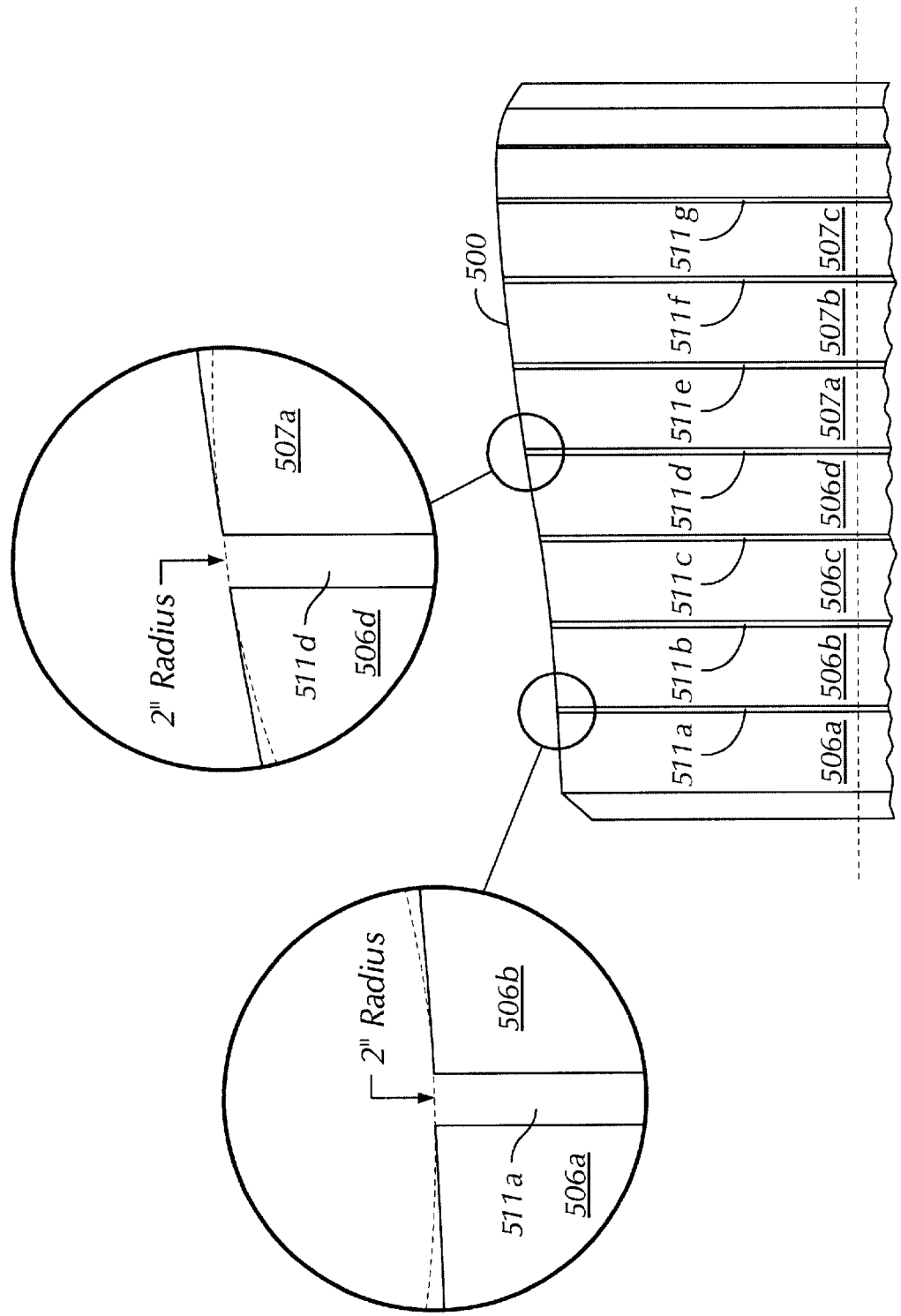
FIG. 5A shows a partial cross-sectional view of an embodiment of the casing expansion tool of the current invention.

Radius intervals 511A through 511C may be included to provide a radiused transition from one expansion segment to the next, following conventional machining practice. See FIG. 5A, which shows a partial cross section of expansion tool 500 shown in FIG. 5, and expanded views of radius interval 511A (between expansion segments 506A and 506B) and of radius interval 511D, between expansion segments 506D and 507A. In this embodiment of the current invention, radius intervals 511A through 511C have concave radii of curvature of about 2 inches, which yields a smooth transition from one expansion segment to the next, but which has an axial length which is less than one tenth of the axial length of the neighboring expansion segments. By contrast, radius intervals 511D through 511G have convex radii of curvature of about 2 inches.

Figure 5B:
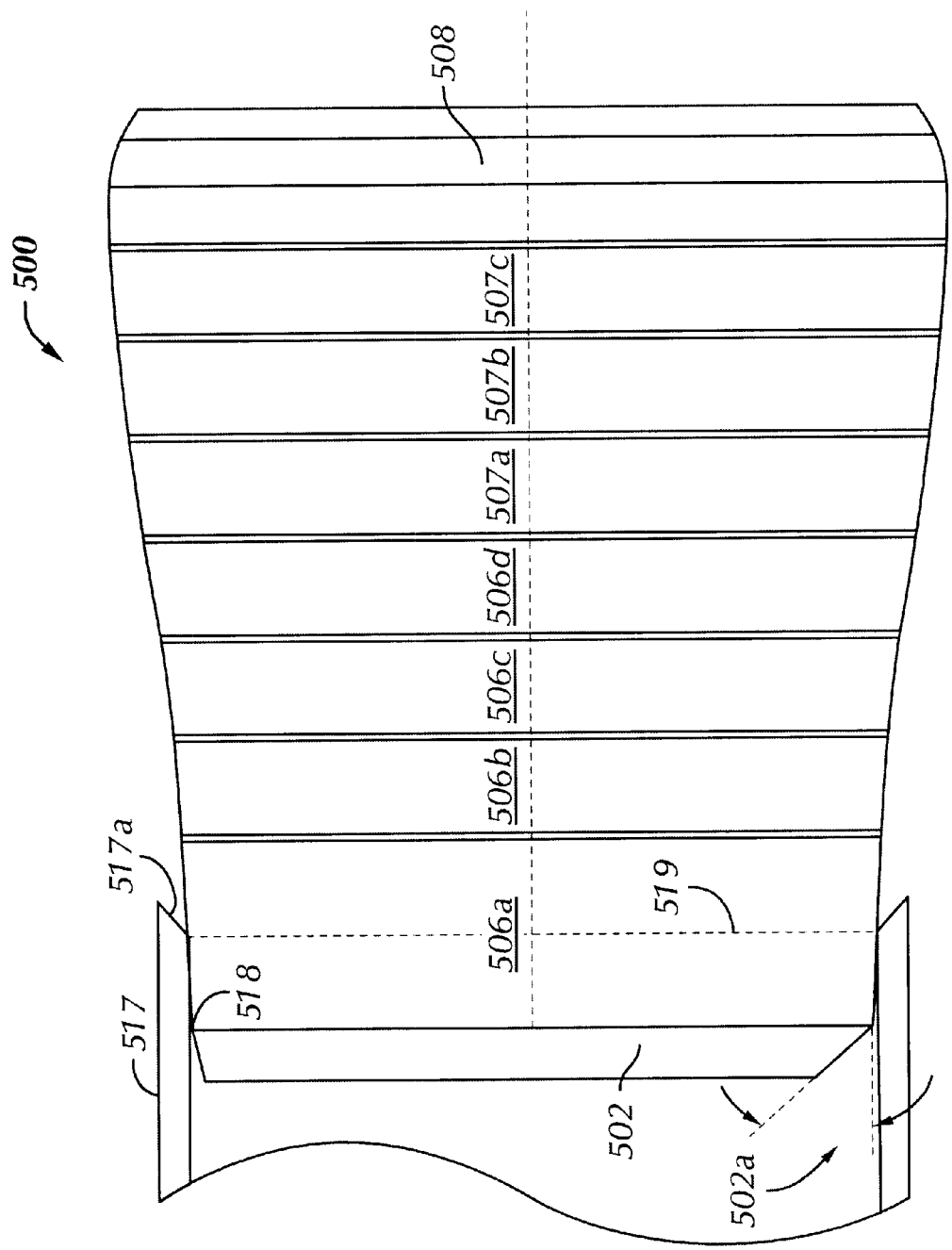
FIG. 5B shows a cross section of another embodiment of the casing expansion tool of the current invention entering a casing pipe.

FIG. 5B shows a cross section of an embodiment of the expansion tool 500 of the current invention entering a casing or pipe 517 to be expanded. In this embodiment, first chamfer 502 has chamfer angle 502A which matches the chamfer angle on pipe chamfer 517A, and the axial length of first chamfer 502 is longer than the first chamfer shown in FIG. 5 and FIG. 5A. These modifications ensure that the tool 500 will pilot inside the casing 517 when starting the expansion process.

In addition, first expansion segment 506A of first expansion section 506 is about twice the length of each of the other expansion segments 506B through 506D and 507A through 507C. The first diameter 518 of expansion segment 506A is determined so that the nominal ID of casing 517 will contact the surface of expansion segment 506A at first contact plane 519, which is located approximately halfway along the surface of expansion segment 506A. That is, the length of segment 506A after contact plane 519 is approximately the same as the length of the other expansion segments. These features ensure that expansion segment 506A can be stabbed deeply into the casing 517 to be expanded, but that allowance has been made for variation in pipe ID from its nominal ID.

Referring again to FIG. 1, when expansion tool 500 is forced through casing, one would expect that the casing ID will be expanded to a new diameter which is the same as the largest diameter of expansion tool 500, namely the diameter of cylindrical section 508. However, in practice, frustoconical-type expansion tools are typically moved through solid casing or expanded metal screens as quickly as possible, with the result that the casing ID usually expands to a diameter larger than the largest diameter of the expansion tool used. This additional amount of expansion is conventionally called "surplus" expansion. This surplus expansion may be caused by differential stresses created by the expansion process. The amount of surplus expansion seems to depend on the design of the expansion tool, the coefficient of friction between the tool and the casing, and the rate of application of the tool to the casing. At the current state of the art, the amount of surplus expansion is most economically determined in an empirical fashion, by testing particular combinations of expansion tools and tubular goods at different rates of expansion tool travel.

Expansion tool 500 is designed for a particular application by first establishing the following variables:
    nominal ID of the unexpanded casing pipe
    expanded ID of the expanded casing pipe diametrical surplus expansion expected L2=engaged thread length 105 (in FIG. 1) of the tubular threaded connection Diameter of the expansion tool of this embodiment of the current invention at first contact plane 519 in FIG. 5B is designed to be equal to the nominal ID of the unexpanded casing pipe 517.

The diameter of the cylindrical section 508 in FIG. 5B is designed to be equal to the expanded ID of the expanded casing, less the diametrical surplus expansion.

The difference between the diameter of the first contact plane 519 in FIG. 5B and the diameter of the cylindrical section 508 in FIG. 5B is the required diametrical change in the expansion tool 500.

In one embodiment, the axial length of each expansion segment within first expansion section 506 and second expansion section 507 has been determined by experiment to be between about L2 (engaged thread length 105 in FIG.1), and about 0.1 L2 (or, one-tenth of the engaged thread length). In another embodiment, the axial length of each expansion segment within first expansion section 506 and second expansion section 507 has been determined by experiment to be between about 0.8 L2, and about 0.2 L2. In another embodiment, the axial length of each expansion segment within first expansion section 506 and second expansion section 507 has been determined by experiment to be between about 0.5 L2, and about 0.25 L2.

In one embodiment, the combined length of the first expansion section 506 and second expansion section 507 must be at least about L2 (engaged thread length 105 in FIG. 1).

In one embodiment, all of the expansion segments are of equal axial length. In another embodiment, all of the expansion segments are of equal axial length with the exception of the first expansion segment 506A of the first expansion section 506, which can be made longer to facilitate stabbing the expansion tool into the casing, as shown in FIG. 5B. Longer axial length of the expansion segments may increase the friction between the expansion tool and the casing, and may result in a smaller surplus expansion. Shorter axial length of the expansion segments may reduce the friction between the expansion tool and the casing during the expansion process, but may result in a larger surplus expansion.

In another embodiment, each expansion segment may have a different axial length in order to make the contact patches have a uniform length. Generally, as the cone angle increases, the length of the contact patch increase. In order to equalize the length of the contact patches, the segments with a higher cone angle would have a shorter axial length, while the segments with a lower cone angle would have a longer axial length.

A "step-angle" between about 2 degrees and about 6 degrees may be selected. This step angle will be the cone angle of the first expansion segment 506A and the absolute value of the change in angle between contiguous expansion segments. For example, the included angle between the expansion segments in first expansion section 506 in FIG. 2 is 177.5 degrees, so that the step angle is 2.5 degrees, or the absolute value of 180 degrees minus the included angle. It has been found by Finite Element Analysis that the step angle for moderate casing expansions, typically between 10–15%, may be from about 2 to about 2.5 degrees.

A total number of expansion segments is selected, which may be an odd integer. In most cases of casing expansion, it has been found that about 7 or about 9 expansion segments may be practical, although it is possible to design a serviceable tool with more or fewer segments.

The following equations relate the expansion segment length, the step angle, and the total number of segments to the required diametrical change in the expansion tool. For each segment:

$$H = L \tan \beta$$

where:

H=radial height of segment

L=axial length of segment $\beta$=step angle

For an expansion tool with seven expansion segments, this yields $$H1 = L \tan \beta + L \tan 2\beta + L \tan 3\beta + L \tan 4\beta$$

$$H2 = L \tan \beta + L \tan 2\beta + L \tan 3\beta$$

and $$H\text{TOTAL} = H1 + H2$$

where

H1=radial height of First Expansion Section

H2=radial height of Second Expansion Section

HTOTAL=total radial height of the expansion tool

Which yields $$H\text{TOTAL} = L \tan \beta + L \tan 2\beta + L \tan 3\beta + L \tan 4\beta + L \tan \beta + L \tan 2\beta + L \tan 3\beta$$

$$H\text{TOTAL} = 2L (\tan \beta + \tan 2\beta + \tan 3\beta + \tfrac{1}{2} \tan 4\beta)$$

$$D\text{TOTAL} = 4L (\tan \beta + \tan 2\beta + \tan 3\beta + \tfrac{1}{2} \tan 4\beta)$$

where

HTOTAL=total radial height of expansion tool

DTOTAL=total diametrical change in expansion tool

For example, if it is desired to expand a 7⅝ inch OD oilfield casing pipe with a nominal ID of 6.875 inches, to an expanded ID of at least 8.005 inches (an expansion of 16%), an expansion tool according to the embodiment of the current invention shown in FIG. 2 could be designed as follows:

The first contact plane 519 in FIG. 5B should be 6.875 inches, the ID of the unexpanded 7⅝ inch, 29.70 pound per foot casing.

Assuming a surplus expansion (established empirically by experimentation) of about 1%, the diameter of the cylindrical section 508 in FIG. 2 should be 8.005 inches less 1%, or 7.925 inches.

The total diametrical change required in the expansion tool is therefore 1.050 inches.

For an expansion tool with seven expansion stages and a step angle of 2 degrees ($\beta$=2 degrees) the segment length is calculated as follows:

$$D\text{TOTAL} = 4L (\tan \beta + \tan 2\beta + \tan 3\beta + \tfrac{1}{2} \tan 4\beta)$$

$$1.050 = 4L (\tan 2 8 + \tan 4 8 + \tan 6 8 + \tfrac{1}{2} \tan 8 8)$$

$$1.050 = 4L (0.280)$$

$$L = 1.050/1.120 = 0.937 \text{ inches}$$

For a threaded connection with an engaged thread length (L2) of 3 inches, a segment length of 0.937 inches represents 0.312 L2, within the range for expansion segment length of 0.25 L2 to 0.5 L2.

Figure 6:
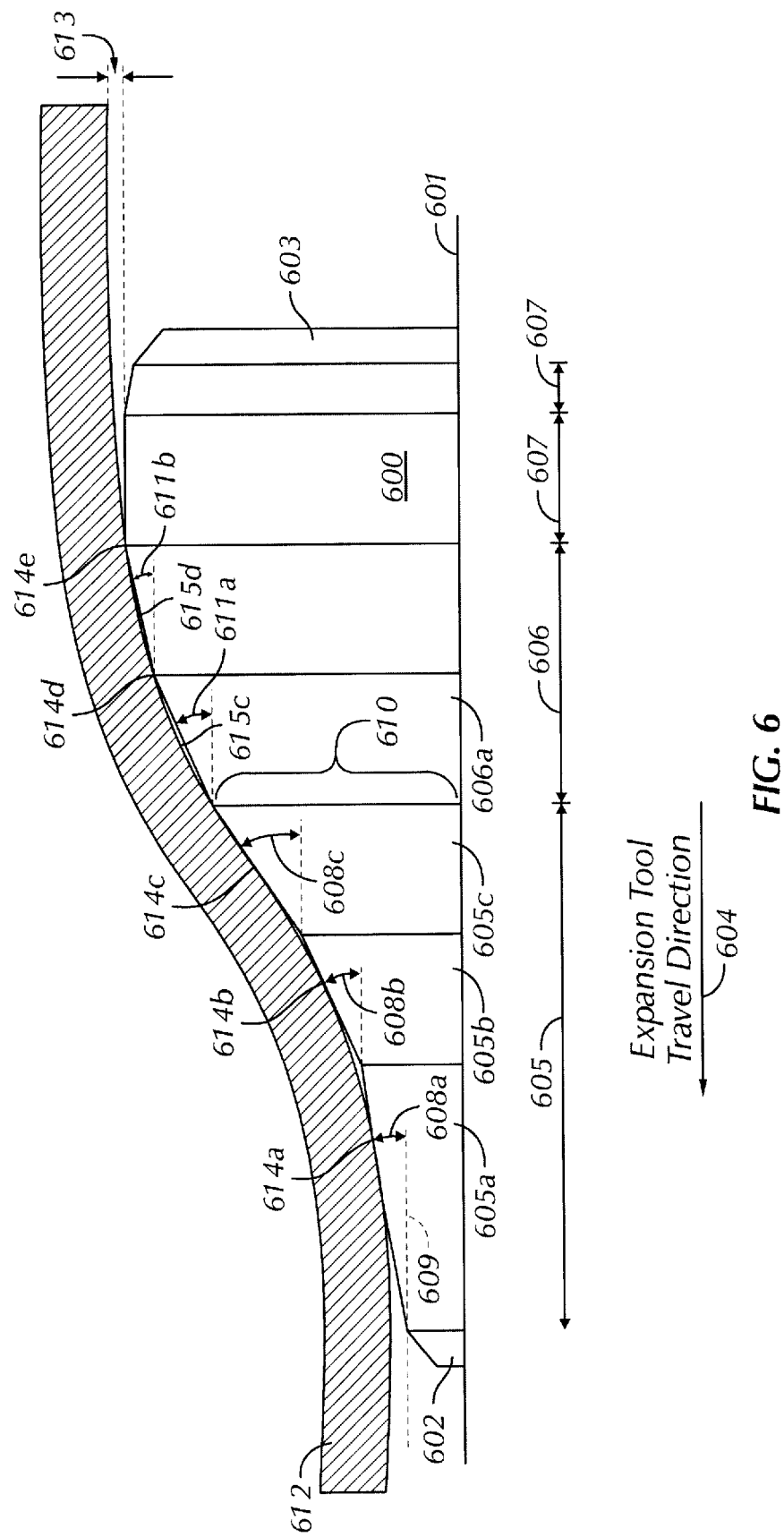
FIG. 6 shows a partial cross-sectional view of an embodiment of a five-segment expansion tool of the current invention.

FIG. 6 shows a cross-sectional view of a five-segment expansion tool which is another embodiment of the current invention. In this embodiment, the cone angles and the changes in cone angles between segments are much larger than the equivalent angles of the embodiments shown in FIGS. 5, 5A, and 5B. This means that the included angles between expansion segments 605A through 605C are much smaller, and included angles between expansion segments 605C, 606A and 606B are much larger, than the equivalent angles of the embodiments shown in FIGS. 5, 5A, and 5B. These angles are exaggerated in the view of FIG. 6 primarily for the purposes of clarity.

Expansion tool 600 has center-line 601, first chamfer 602, last chamfer 603, and expansion tool travel direction 604. Tool 600 also has first expansion section 605, second expansion section 606, cylindrical section 607, and tail section 608.

First expansion section 605 is divided into three expansion segments 605A through 605C, each with a different cone angle. For purposes of clarity, no radius intervals are shown between the expansion segments. Second expansion section 606 is divided into two segments 606A and 606B.

Expansion segment 605A has a cone angle 608A of 12 degrees from cylindrical plane 609. Expansion segment 605B has cone angle 608B of 24 degrees, and expansion segment 605C has a cone angle 608C of 36 degrees. In the second expansion section 606, expansion segment 606A has cone angle 611A of 24 degrees, and expansion segment 606B has cone angle 611B of 12 degrees. First expansion section 605 and second expansion section 606 are separated by inflection plane 610.

Casing 612 is shown during the process of expansion. As the expansion tool passes through the casing pipe, the casing pipe shows the characteristic surplus expansion 613, which is the difference between the ID of the expanded casing pipe and the largest OD of the expansion tool, namely the diameter of cylindrical section 607.

Expansion segments 605B, 605C, 606A, and 606B are all approximately the same axial length, while expansion segment 605A is approximately twice as long as the other expansions, as in the embodiment of the current invention shown in FIG. 5B, in order to ease entry into the casing pipe. Alternatively, expansion segments 605B, 605C, 606A, and 606B may have varying lengths in order to equalize the length of the contact patches 614A through 614E as discussed above.

The large cone angles of the expansion segments on the expansion tool shown in FIG. 6 allow one to clearly see the contact patches 614A through 614E between casing pipe 612 and expansion tool 600. Note that the contact patches 615A through 615C in first expansion section 605 occur near the middle of their respective expansion segments, while contact patches 614D and 614E in second expansion section 606 occur at the inflection planes between the segments. Contact patch 614C, which occurs immediately before inflection plane 610 is characteristically axially longer than the other contact patches, and clearance gap 615C, immediately after inflection plane 610, is axially longer than the other contact patches.

FIG. 6 shows many of the important elements of the current invention. A plurality of contact patches provide support under the threaded tubular connection during the expansion process. In one embodiment, there are at least two contact patches. In another embodiment, there are at least three contact patches. In another embodiment, there are at least four contact patches. Relatively small included angles between the expansion stages limit the strain rate imposed on the casing pipe. The expansion tool has two distinct sections of expansion stages: the first section is nominally "concave", that is, the included angle between stages within the first section is less than 180 degrees. The second section is nominally "convex", that is, the included angle between stages within the second section is greater than 180 degrees. Clearance gaps between the contact patches both reduce friction between the expansion tool and the expanding pipe, and it is believed, allow the stresses in the expanding casing to equalize or equilibrate through the entire thickness of the pipe body and the tubular threaded connection during expansion.

Design of prior art expansion tools has followed the intuitive principle that the profile of the expansion tool should be in contact with the expanding casing pipe as long as possible, consistent with limiting the friction between the expansion tool and the casing pipe to control the expansion force required. It has been discovered through Finite Element Analysis and experimentation, however, that an uninterrupted expansion tool profile may result in large differences between residual stresses at the OD of the pipe and residual stresses at the ID of the pipe. These differential residual stresses are generally not deleterious in the pipe body, but may inevitably cause the failure of threaded tubular connections at the end of a pipe joint, where the residual stresses can not be relieved by a neighboring pipe-body element, but must be relieved through the threaded tubular connection. It has been demonstrated that even the best available wedge thread connection may not tolerate moderate radial plastic expansion (on the order of 10 percent or greater) by a full-contact expansion tool of the prior art without failure of the connection and/or the metal-to metal seal.

Figure 7:
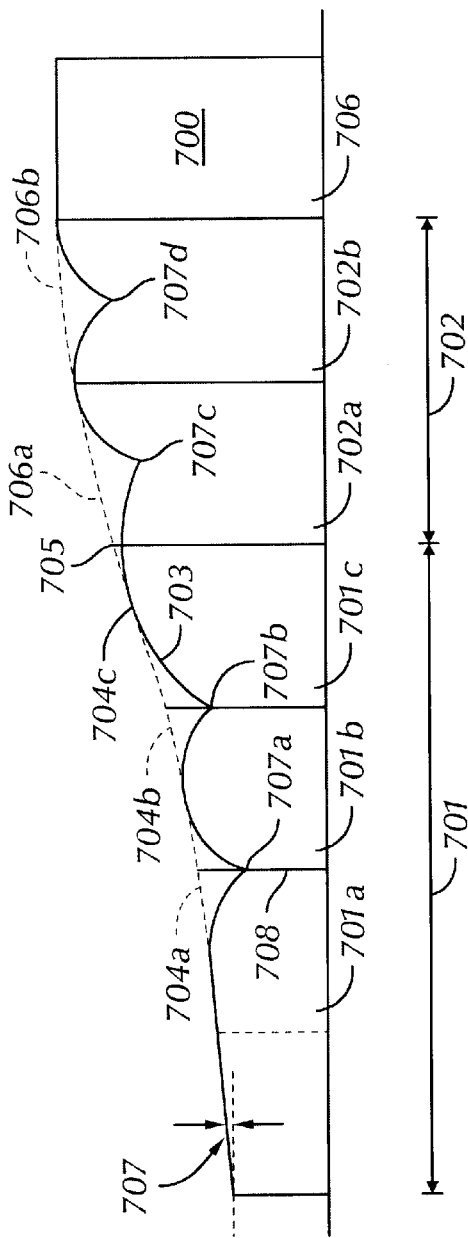
FIG. 7 shows a partial cross-sectional view of another embodiment of the expansion tool of the current invention.

FIG. 7 shows a cross-section of another embodiment of the expansion tool of the current invention. Expansion tool 700 has expansion surface profile 703, cylindrical section 706, first expansion section 701 with expansion segment 701A through 701C, and second expansion section 702 with expansion segments 702A and 702B. First expansion section 701 and second expansion section 702 are separated by inflection plane 705. Each expansion segment has a frusto-conical contact plane 704A through 704C and 706A and 706B. The nominal contact planes are tangential to the contact patch on the surface of each expansion segment. The expansion surface profile 703 is radially relieved (or "cutback") between the contact patches to form radial relief grooves 707A through 707D. In this embodiment, the relief grooves form an acute angle at their roots.

For example, contact plane 704A has a cone angle 707 of 6 degrees, and intersects contact plane 704B, which has a cone angle of 12 degrees, at plane 708 separating expansion elements 701A and 701B. In turn, contact plane 704C has a cone angle of 18 degrees, contact plane 706A has a cone angle of 12 degrees, and contact plane 706B has a cone angle of 6 degrees.

Essentially, the contact planes are "ghost" tangential surfaces which describe an embodiment of the current invention in which the expansion elements are a series of contiguous frustoconical surfaces. The embodiment shown in FIG. 7 can in fact be created by machining-away the expansion surface profile described by the contact planes until the shape of contact surface profile 703 is achieved, preserving the contact patches intact, but radially relieving the clearance gaps.

Figure 8:
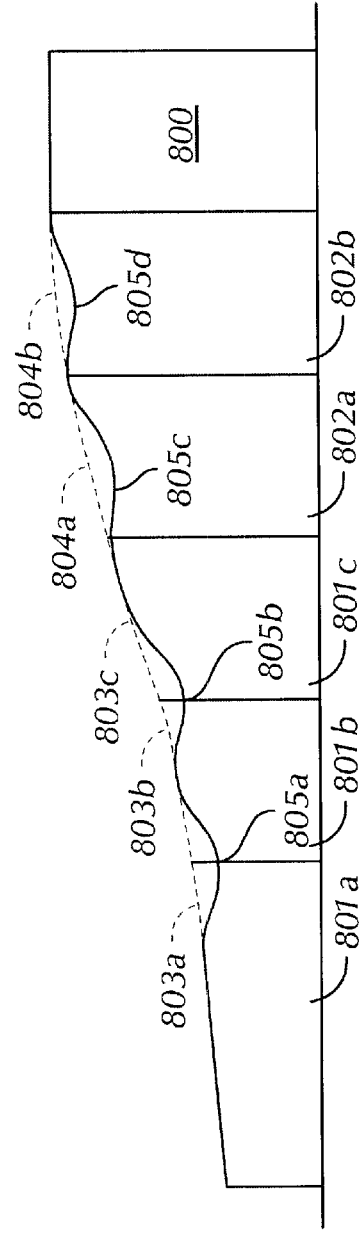
FIG. 8 shows a partial cross-sectional view of another embodiment of the expansion tool of the current invention.

FIG. 8 shows another embodiment of the current invention similar to that shown in FIG. 7. Expansion tool 800 has expansion segments 801A through 801C, and 802A and 802B, and contact planes 803A through 803C, and 804A and 804B. Cone angles for the contact planes in this embodiment are the same as for the embodiment shown in FIG. 7. However, in this embodiment, radial relief grooves 805A through 805D are smooth troughs.

Figure 9:
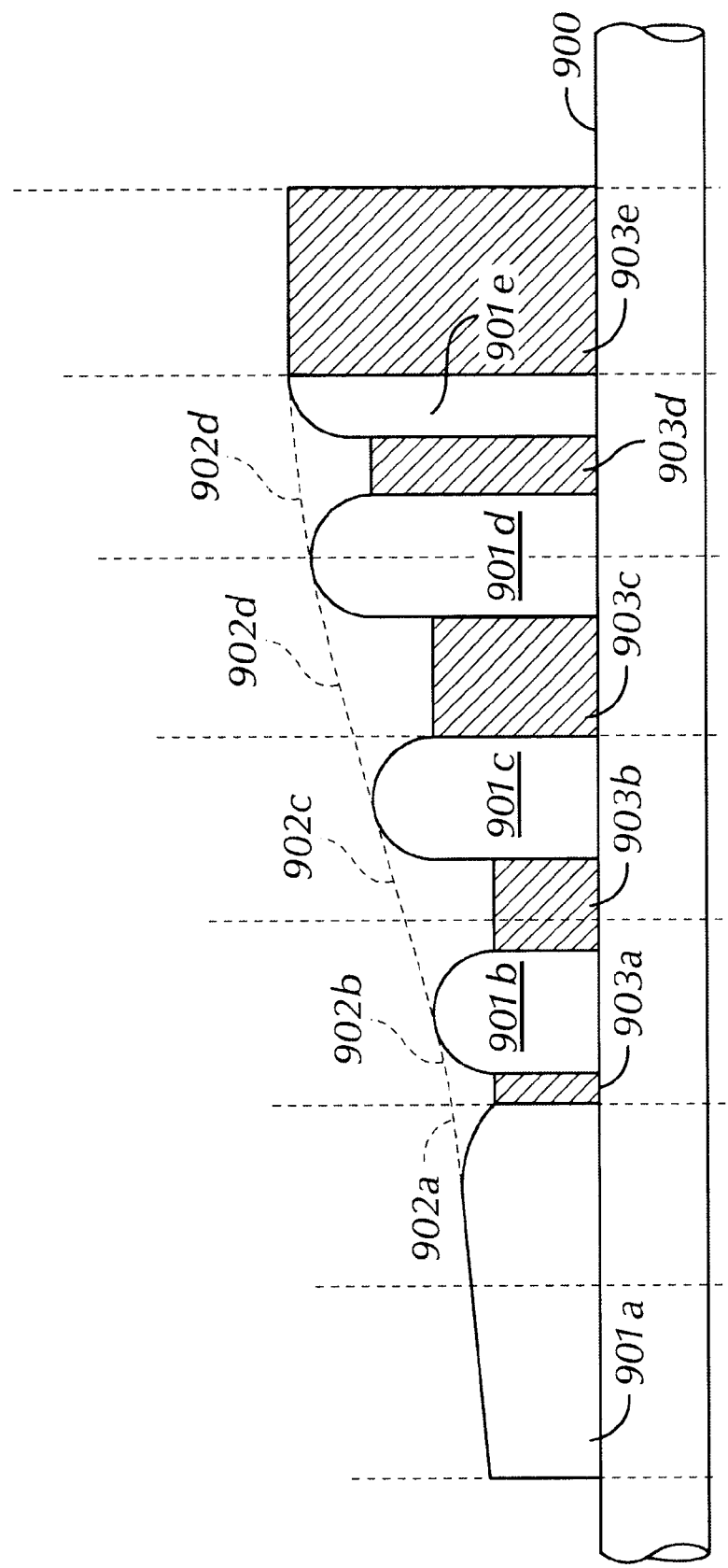
FIG. 9 shows a partial cross-sectional view of another embodiment of the expansion tool of the current invention.

FIG. 9 shows another embodiment of the expansion tool of the current invention. This is a multi-part expansion tool which consists of a central shaft 900 about which are positioned a series of disks of varying profiles. Expansion die disks 901A through 901D have contact patches tangential to contact planes 902A through 902D. In one embodiment, the expansion die disks may be made from a very hard and durable material with a low coefficient of friction when used in cold-forming steel, for example a microgram tungsten carbide, or a ceramic material. Spacer spools 903A through 903E serve to axially position and support the expansion die disks on the central shaft. The disks may be secured on the shaft by any conventional means, including threaded end caps or shear pins, for example. This embodiment has the advantage that a relatively small inventory of die disks and spacer spools can be used to assemble a large range of expansion tools, that certain variables (such as the surplus expansion ratio) can be field-adjusted, and that individual die disks can be replaced or repaired rather than repairing an entire tool.

Figure 10:
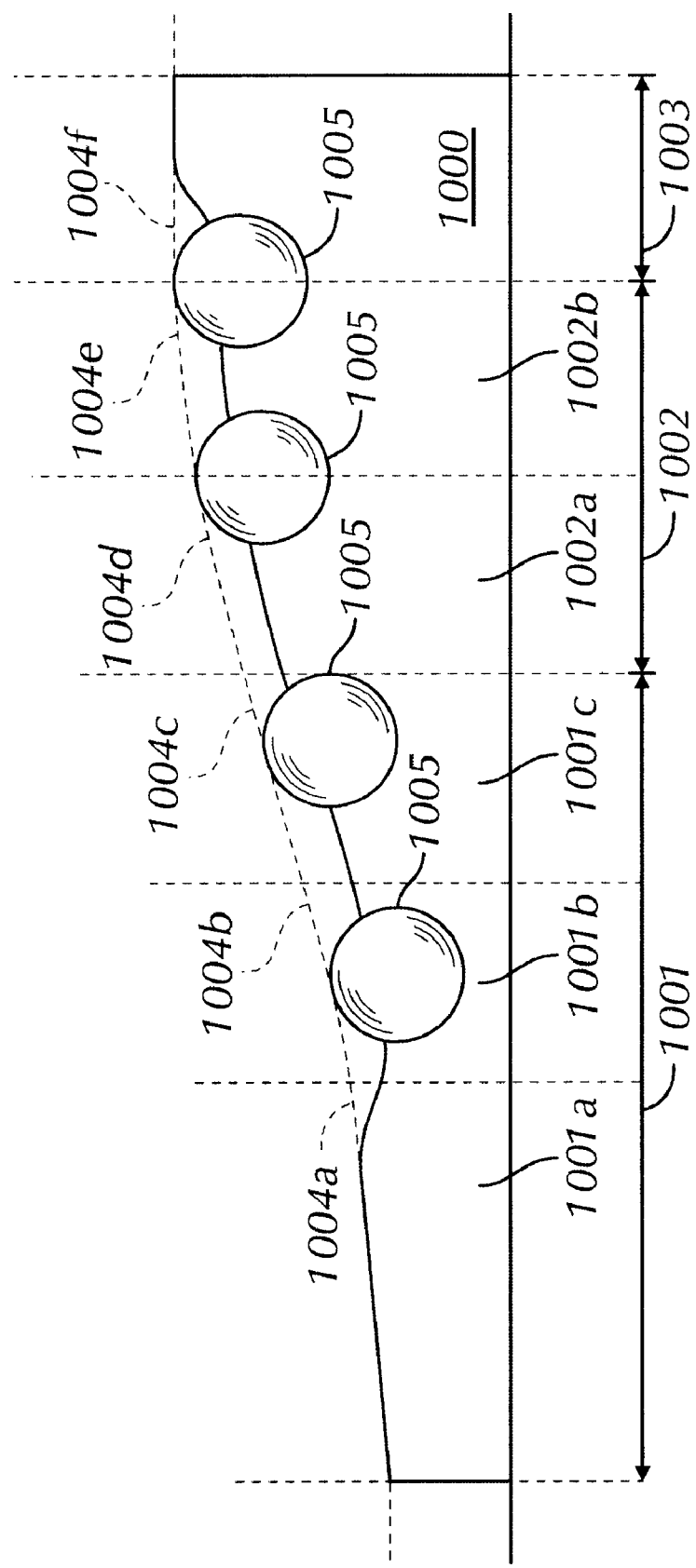
FIG. 10 shows a partial cross-sectional view of another embodiment of the expansion tool of the current invention.

FIG. 10 shows another embodiment in which the surfaces of ball-bearings are used to provide contact patches along the length of an expansion tool. Expansion tool 1000 is divided into first expansion section 1001, second expansion section 1002, and cylindrical section 1003. First expansion section 1001 has expansion segments 1001A through 1001C. Second expansion section 1002 has expansion segments 1002A and 1002B. Ball bearings 1005 are mounted in expansion tool body 1000 such that the surface of the ball bearing is tangential to the contact planes. This embodiment has the advantage that friction between the expansion tool and the casing pipe during the expansion process can be greatly reduced, and that the tool may be easily rotated as it is advanced. Depending on the helix angle described by a ball bearing as the expansion tool is rotated and advanced through the casing pipe at the same time, rotating the tool can yield a much lower effective cone angle than straight axial advancement of the expansion tool. In one embodiment, if the helix angle is known with some precision, that is, if the rate of axial travel and rate of rotation are both known, the ball bearings can be helically staggered around the circumference such that the circumferential gap between the balls is minimized. In another embodiment, the ball bearings can be circumferentially located around the tool.

Figure 11:
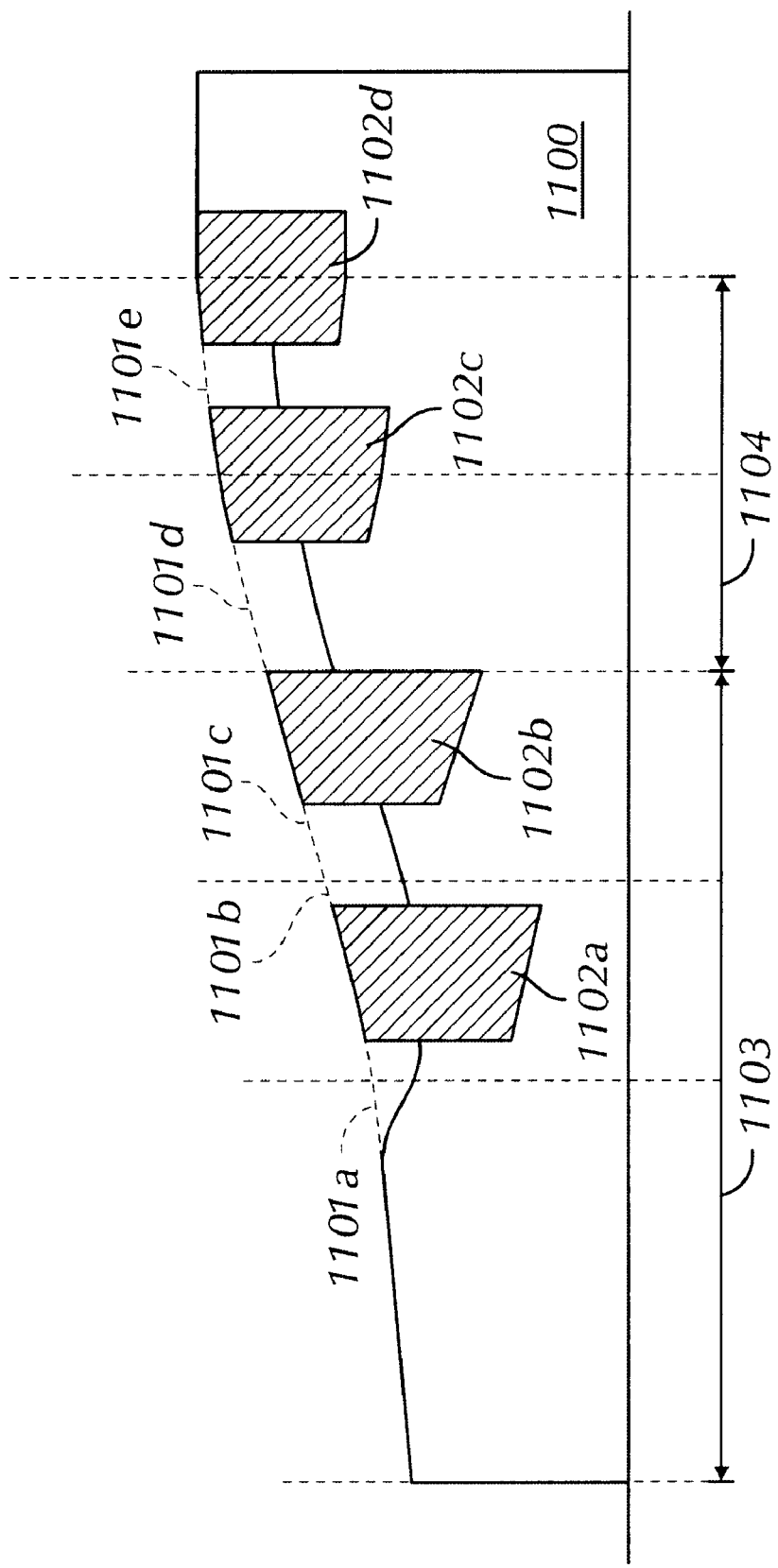
FIG. 11 shows a partial cross-sectional view of another embodiment of the expansion tool of the current invention.

FIG. 11 shows another embodiment which uses expansion rollers 1102A through 1102D mounted in expansion tool 1100 such that the radial surface of the rollers follows the contact planes 1101A through 11101E. Expansion tool 1000 has first expanding section 1103 and second expansion section 1104. The expansion rollers are located axially such that they form the contact patches of the expansion tool. Expansion rollers 1102A and 1102B, in first expansion section, are located near the middle of an expansion segment, and have simple frustoconical profiles with cone angles equal to the cone angles of their associated contact planes. Expansion rollers 1102C and 1102D, in second expansion second, are located between expansion segments, and have compound frustoconical profiles with an obtuse included angle.

In one embodiment, the tool of this invention is lowered into a borehole and then pulled and/or forced up the borehole by fluid pressure in order to expand the casing. Pulling and/or forcing a tool up a borehole to expand casing is known in the art.

In another embodiment, the tool of this invention is pushed and/or forced down the borehole by fluid pressure in order to expand the casing, and then retrieved or abandoned. Pushing and/or forcing a tool down a borehole to expand casing is known in the art.

In one embodiment, the tool of this invention is a static single piece of material, for example steel, that has been machined and/or formed to achieve the desired shape to expand casing.

In another embodiment, the tool of this invention is made up a plurality of radially movable parts for defining an outer surface thereof as disclosed in U.S. Pat. No. 6,012,523, issued to Campbell et al. The plurality of radially movable parts would be formed so as to form a plurality of contact patches, for example 2, 3, 4, 5, 6, or 7, as discussed above.

In another embodiment, the tool of this invention includes a hydraulic mechanism that can serve to expand and/or contract the tool. The tool could be expanded before being used to expand casing, and the tool could be contracted before being run through casing in an unexpanded state. In another embodiment, the tool of this invention includes a mechanical mechanism and/or an electromechanical mechanism that can serve to expand and/or contract the tool.

In another embodiment, the tool is made up of a number of pieces that can be collapsed and/or disassembled in order to allow the tool to fit through small diameter orifices. In addition, the pieces can be expanded and/or reassembled prior to being used to expand casing.

It will be apparent to those skilled in the art that the expansion tool of the current invention can assume many different shapes other than a monolithic "pig" with frustoconical segments.

Advantages of the invention may include one or more of the following:

A mechanical expansion technique that is reliable and/or relatively inexpensive;

An expansion tool having the ability to radially deform tubular threaded connections, which are conventionally used to join together segments ("joints") of casing pipe into a long string, without significantly weakening the loadcarrying capacity of the threaded connection, and/or without destroying the metal-to-metal seals commonly required in such threaded connections; and An expansion tool that generates relatively low friction forces between the tool and the casing during the expansion process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tool for radially plastically expanding a pipe having a threaded connection therein, comprising:

a first section having an increasing diameter and increasing cone angle along a direction of travel through the pipe, the first section comprising a first outer surface adapted to contact an inner surface of the pipe at a plurality of selected contact patches on the first outer surface; and a second section axially disposed behind the first section along the direction of travel, the second section having an increasing diameter and decreasing cone angle along the direction of travel, the second section comprising a second outer surface adapted to contact the inner surface of the pipe at at least one selected contact patch on the second outer surface.

2. The tool of claim 1, wherein the first section comprises three contact patches, said three contact patches defining a concave profile of the first outer surface, and wherein the second section comprises two contact patches, said two contact patches defining a convex profile of the second outer surface.

3. The tool of claim 1, wherein the first and second sections comprise a plurality of frustoconical elements.

4. The tool of claim 3, wherein each frustoconical element in the first section has a cone angle and axial length selected so that at most one contact patch is disposed on each frustoconical element in the first section.

5. The tool of claim 1, further comprising a plurality of radial relief grooves on the first and second outer surfaces between said contact patches.

6. The tool of claim 5, wherein at least one of the radial relief grooves comprises an acute angle at a root of said groove.

7. The tool of claim 6, wherein at least one of the radial relief grooves comprises a smooth trough.

8. The tool of claim 1, further comprising a plurality of disks, wherein said selected contact patches are located on said disks.

9. The tool of claim 8, wherein the disks comprise at least two different profiles.

10. The tool of claim 9, further comprising at least one spacer between at least two of said disks.

11. The tool of claim 1, further comprising a plurality of ball bearings on the first and second outer surfaces, wherein said selected contact patches are located on said ball bearings.

12. The tool of claim 1 wherein said ball bearings are arranged helically about at least one of said first outer surface and said second outer surface.

13. The tool of claim 12 wherein said ball bearings are arranged circumferentially about at least one of said first outer surface and said second outer surface.

14. The tool of claim 1, further comprising a plurality of expansion rollers, wherein said contact patches are located on said expansion rollers.

15. The tool of claim 1, wherein the first and second sections comprise a plurality of elements each defining a cone angle, a first element having a cone angle between about 2 and about 6 degrees, an included angle between adjacent segments being between about 174 and about 186 degrees.

16. The tool of claim 1, wherein the first and second sections comprise a plurality of frustoconical elements each defining a cone angle, a change in angle between each element being between about 2 degrees and about 2.5 degrees.

17. A method of expanding casing comprising:
forcing a casing expansion tool through a casing segment, wherein the casing segment has a smaller inside diameter than a largest outside diameter of said expansion tool;
wherein said expansion tool comprises a first section having an increasing diameter and increasing cone angle along a direction of travel through the casing segment, the first section comprising a first outer surface adapted to contact an inner surface of the casing segment at a plurality of selected contact patches on the first outer surface; and a second section axially disposed behind the first section along the direction of travel, the second section having an increasing diameter and decreasing cone angle along the direction of travel, the second section comprising a second outer surface adapted to contact an inner surface of the pipe at at least one selected contact patch on the second outer surface.

18. A tool for radially plastically expanding a pipe having a threaded connection therein, the connection having an engaged thread length L2, the tool comprising:
a first section having an increasing diameter and increasing cone angle along a direction of travel through the pipe, the first section comprising a first outer surface adapted to contact an inner surface of the pipe at a plurality of selected contact patches on the first outer surface; and
a second section axially disposed behind the first section along the direction of travel, the second section having an increasing diameter and decreasing cone angle along the direction of travel, the second section comprising a second outer surface adapted to contact the inner surface of the pipe at at least one selected contact patch on the second outer surface;
wherein the first and second section have a length at least about L2.

19. The tool of claim 18, wherein the first and second sections further comprise a plurality of expansion segments, and each of said contact patches is located on one of said expansion segments.

20. The tool of claim 19, wherein each of said expansion segments has a length between about 0.1*L2 and L2.

21. The tool of claim 20 wherein each of said expansion segments has a length between about 0.2*L2 and 0.8*L2.

22. The tool of claim 21 wherein each of said expansion segments has a length between about 0.25*L2 and 0.5*L2.

23. The tool of claim 20 wherein a first of said expansion segments of said first section has a length at least about twice the length of an average length of the other expansion segments of the first and second sections.

24. A tool for radially plastically expanding a pipe having a threaded connection therein, comprising:
a section having an increasing diameter and increasing cone angle along a direction of travel through the pipe, the section comprising an outer surface adapted to contact an inner surface of the pipe at a plurality of selected contact patches on the outer surface.

25. A method of expanding casing comprising
forcing a casing expansion tool through a casing segment axially and rotating said tool about a longitudinal axis of said tool, wherein the casing segment has a smaller inside diameter than a largest outside diameter of said expansion tool;
wherein said expansion tool comprises a first section having an increasing diameter and increasing cone angle along a direction of travel through the casing segment, the first section comprising a first outer surface adapted to contact an inner surface of the casing segment at a plurality of selected contact patches, each contact patch comprising a plurality of ball bearings.

* * * * *